Feb. 21, 1950     G. F. QUAYLE     2,498,504
PALLET TRUCK
Filed April 16, 1948     2 Sheets-Sheet 1
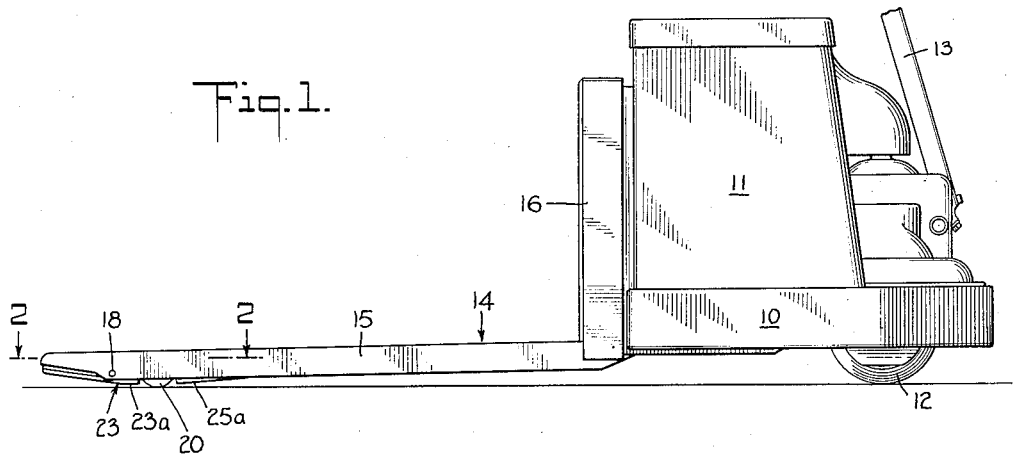
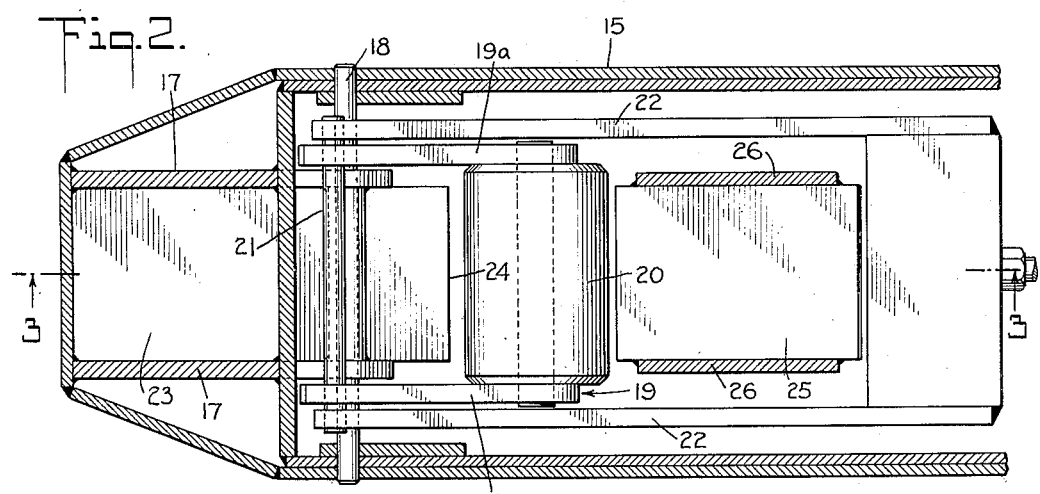
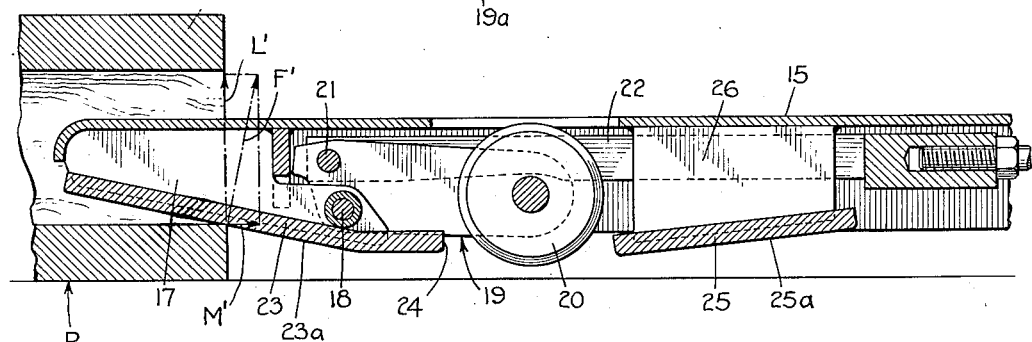
INVENTOR
George F. Quayle
BY
A. H. Golden
ATTORNEY Feb. 21, 1950   G. F. QUAYLE   2,498,504
PALLET TRUCK
Filed April 16, 1948   2 Sheets-Sheet 2
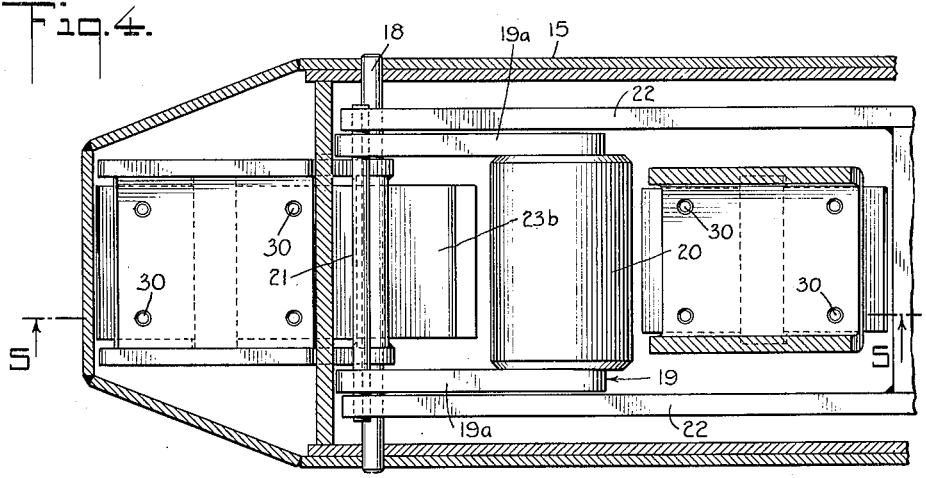
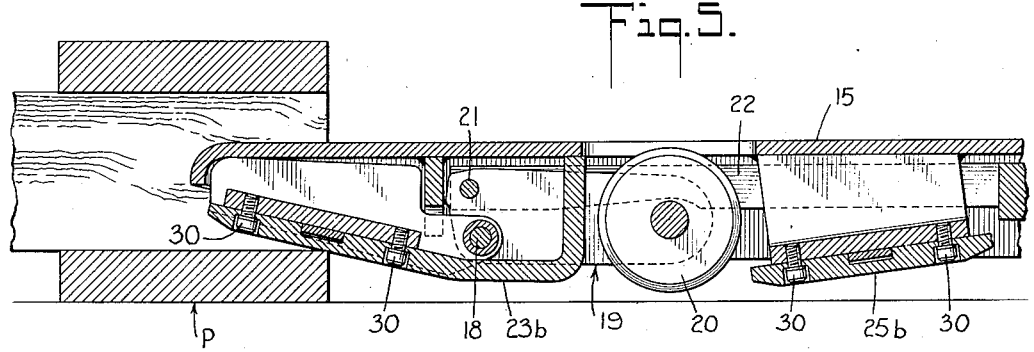
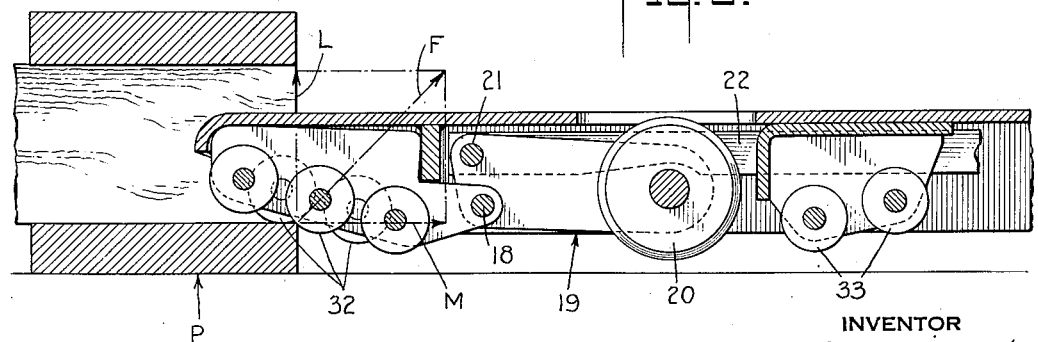
INVENTOR
George F. Quayle
BY
A. H. Golden
ATTORNEY Patented Feb. 21, 1950

2,498,504

UNITED STATES PATENT OFFICE 2,498,504

PALLET TRUCK

George F. Quayle, Philadelphia, Pa., assignor to
The Yale & Towne Manufacturing Company,
Stamford, Conn., a corporation of Connecticut Application April 16, 1948, Serial No. 21,347

4 Claims. (Cl. 280—43)

This invention relates to a hand lift truck of the type used in industrial plants for lifting and transporting loads stacked on a pallet.

Trucks of the particular class are required to have exceedingly low load lifting platforms in order that those platforms may enter between the upper and lower floors of the standard commercial pallet. In operation, lifting wheels are mounted for movement relatively to the platform of a pallet truck, these wheels moving downwardly relatively to the trucks through spaces between the floor boards of the pallet and against the ground or floor. It is in this manner that the pallet is elevated and then adapted to be transported by the truck.

In order for a truck of the particular class to move into position between the floors of a pallet, its small wheels must strike the several floor boards of the pallet to be lifted together with the truck by each of the floor boards. A somewhat similar action takes place when the truck is moved outwardly from between the floors of the pallet. Those skilled in the art understand just how difficult it is to so move a truck since the small wheels contribute considerable resistance to the truck movement each time that they engage a floor board.

In order to minimize this difficulty, it has been suggested that a series of rollers be placed at each side of the small lift wheels of a pallet truck, the rollers being spaced vertically and longitudinally from one another. Thereby, as the truck moves in a direction for entrance between the floors of a pallet, the first roller strikes the first floor board and lifts the truck somewhat. The next roller lifts the truck just a little more, and the third roller a little more, until finally the wheels of the truck encounter the floor board and move very easily into position on the board. While this use of rollers has somewhat eased the problem presented, it is nevertheless still rather difficult to maneuver a truck of the class described into position between the floors of a pallet because of the relatively small diameter of the rollers. Thus, each roller, because of its small diameter, still contributes considerable resistance to the movement of the truck as it strikes a pallet board. I have conceived a construction that facilitates greatly the movement of a pallet truck into position between the floors of a pallet by decreasing to a minimum the work that must be done in raising the truck to that level where the lift wheels thereof may ride easily onto the floor boards of the pallet.

In essence, my invention contemplates the use of cams so positioned relatively to the wheels of the truck as to encounter the floor boards in advance of the wheels and to cam the truck upwardly so as to bring the wheels approximately into the plane of the pallet floor boards. My invention marks a rather complete departure from the teachings of the prior art in that it substitutes for what everyone has thought to be the best means to facilitate raising of a truck, means that would at first thought be considered inefficient and undesirable and which therefore would not occur to those skilled in the art as a solution to the problem. It is this use of such means, here in the form of cams that are much more efficient than rollers, that constitutes the conception on which my structure is based.

I have thus outlined rather broadly the more important features of my invention in order that the detailed description thereof that follows may be better understood, and in order that my contribution to the art may be better appreciated. Those skilled in the art will appreciate that the conception on which my disclosure is based may readily be utilized as a basis for the designing of other structures for carrying out the purposes of my invention. It is important, therefore, that the claims to be granted me shall be of sufficient breadth to prevent the appropriation of my invention by those skilled in the art.

Referring now to the drawings, Fig. 1 is an elevation of a truck in which my invention is shown embodied. Fig. 2 is a section taken along lines 2—2 of Fig. 1. Fig. 3 is a vertical section taken along lines 3—3 of Fig. 2. Fig. 4 is a view similar to Fig. 2, but showing a modified form of the invention. Fig. 5 is a section taken along lines 5—5 of Fig. 4. Fig. 6 is a view similar to Figs. 3 and 5, but showing the use of rollers and demonstrating the forces involved so that those forces may be compared with the forces of Fig. 3.

Referring now more particularly to the drawings, the truck of my invention utilizes a lifting head 10 on which is mounted a battery 11 furnishing the power for actuating the motor that drives forward wheel 12 of the truck. For controlling and steering the truck, a usual type of steering handle 13 is utilized. The elevating platform of the truck is designated generally by reference numeral 14, and as is common in this art, is formed of a pair of legs 15, one of which is shown in Figs. 2 and 4, the legs being welded at their forward ends to the forward standard 16 of the elevating platform 14.

Referring now particularly to the modification of Figs. 2 and 3, there is welded to each leg 15 of the U-frame of the truck a pair of plates 17 supporting a shaft 18 on which is pivotally mounted a link 19 comprising a pair of spaced plates 19a. Link 19 carries a wheel 20, which I term a load lifting wheel, and which is of very small diameter and frequently less than 3". Link 19 is pivoted at 21 to a tension rod 22 that extends to the forward end of the truck, it being the function of the tension rod to rotate link 19 and to move the wheel 20 downwardly, thereby lifting one of the legs 15 of the elevating platform 14. The construction thus identified and described is well known in the art, and is here merely set forth in order that an understanding may be had of my contribution now to be described in detail.

Welded to the two plates 17 is a cam 23, one end of which terminates at 24 in juxtaposed relation to the wheel 20. The surface 23a of the cam 23 is so formed at the end 24 whereby to lie somewhat above the plane of the lower portion of the periphery of wheel 20, so that when the truck is on the ground as in Fig. 1, the wheel 20 will ride against the ground and the surface 23a will be spaced from the ground so as not to interfere with the movement of the truck. A somewhat similar cam 25 having a surface 25a is welded to a pair of downwardly extending plates 26 in turn welded to the upper plate of the leg 15 of the truck.

As is well illustrated in Fig. 3, when the truck is moved toward a position between the floor boards of a pallet P, the cam surface 23a will strike a lower floor board of the pallet and will serve to cam the platform 14 upwardly until the wheel 20 itself strikes the pallet and rides easily upwardly into position. The action of the cam 25 is exactly the same as that of cam 23, except that its surface 25a will function as the truck is moved outwardly of the pallet.

In Figs. 4 and 5, I show substantially the same construction as that shown in Figs. 2 and 3, except that there the cams are designated by reference numerals 23b and 25b and are formed as plates adapted to be fastened by screws 30 to suitable structural members forming part of the truck frame.

In Fig. 6, I illustrate a conventional truck of the prior art in which a series of rollers 32 are utilized in the place of cams 23, 23b of the two modifications of my invention here illustrated. Similarly, rollers 33 are utilized instead of cams 25, 25b of my invention.

In Fig. 6 there is shown a vector arrow L representing the weight of the truck entering between the floors of the pallet P. In an actual experiment performed by me, this weight was 460 pounds. The arrow F represents the resultant force incidental to contact of one of the rollers 32 with a floor board of the pallet P, and in the particular case illustrated, it amounts to 630 pounds. The resulting moving force that must be applied to move the truck inwardly of the pallet is designated by the arrow M and in the case of rollers is 460 pounds.

Referring now to Fig. 3, the weight L' of the truck is 460 pounds, the same as in the case of the truck of Fig. 6. The resultant force F' incidental to the impact of the cam surface 23a with a floor board of the pallet P is now 450 pounds. The moving force M' that is therefore required is merely 80 pounds, or about one-sixth of the force required where rollers are used. Of course, I am here neglecting friction, but actually friction will not be so great as to disturb the ratio of 1 to 6 more than a limited degree.

It seems, therefore, that with the roller construction of the prior art, the truck is required to move upwardly a series of steps in order to effect its final entry into the pallet, and each step requires considerably greater effort than the average effort required where cams are utilized. I have found through actual use of my truck, as compared to trucks of the prior art, that there is a great advantage inherent in my invention, all as herein set forth.

I now claim:

1. In a pallet truck, load wheels, means mounting said wheels at one end of the truck for movement against floor boards of a pallet incidental to the movement of the truck into and out of pallet lifting position, a cam having a surface for contacting a floor board of a pallet, means fixing said cam to form an integral part of said truck with one end of said surface juxtaposed to one of said wheels and just above the horizontal plane of the lowermost portion of the periphery of the said wheel, said surface tapering linearly upwardly away from said end and wheel whereby when it contacts a floor board it gradually cams said truck upwardly to facilitate movement of said wheel relatively to said floor board.

2. In a pallet truck, load wheels, means mounting said wheels at one end of the truck for movement against floor boards of a pallet incidental to the movement of the truck into and out of pallet lifting position, a pair of cams having each a surface for contacting a floor board of a pallet, means fixing said cams to form an integral part of said truck in longitudinally spaced relation thereto and at each longitudinal side of a load wheel to form an integral part of said truck, one end of the surface of each cam lying juxtaposed to said wheel and just above the horizontal plane of the lowermost portion of the periphery of said wheel, said surfaces tapering linearly upwardly away from said ends and away from said wheel in opposite directions longitudinal of said truck whereby when one of said surfaces contacts a floor board it gradually cams said truck upwardly to facilitate movement of said wheel relatively to said floor board.

3. In a pallet truck, load wheels, means mounting said wheels at one end of the truck for movement against floor boards of a pallet incidental to the movement of the truck into and out of pallet lifting position, a cam having a surface for contacting a floor board of a pallet, means fixing said cam to said truck to form an integral part thereof with one end of said surface just above the horizontal plane of the lowermost portion of the periphery of the said wheel, said surface tapering linearly upwardly away from said end and wheel whereby when it contacts a floor board it gradually cams said truck upwardly to facilitate movement of said wheel relatively to said floor board.

4. In a pallet truck, load wheels, means mounting said wheels at one end of the truck for movement against floor boards of a pallet incidental to the movement of the truck into and out of pallet lifting position, a pair of cams having each a surface for contacting a floor board of a pallet, means fixing said cams to said truck in longitudinally spaced relation thereto and at each longitudinal side of a load wheel to form an integral part of said truck, one end of the surface of each cam lying just above the horizontal plane of the lowermost portion of the periphery of said wheel, said surfaces tapering linearly upwardly away from said ends and away from said wheel in opposite directions longitudinal of said truck whereby when one of said surfaces contacts a floor board it gradually cams said truck upwardly to facilitate movement of said wheel relatively to said floor board.

GEORGE F. QUAYLE.

REFERENCES CITED

The following references are of record in the file of this patent:

UNITED STATES PATENTS

| Number | Name | Date |
| --- | --- | --- |
| 2,274,164 | Quayle | Feb. 24, 1942 |
| 2,372,585 | Klumb et al. | Mar. 27, 1945 |